US008763249B2

(12) United States Patent
Whittenberger et al.

(10) Patent No.: US 8,763,249 B2
(45) Date of Patent: Jul. 1, 2014

(54) METHOD OF INSTALLING REACTOR UNITS

(71) Applicant: Catacel Corp., Garrettsville, OH (US)

(72) Inventors: William A. Whittenberger, Leavittsburg, OH (US); David A. Becker, Hiram, OH (US); Randall J. Bartos, Ravenna, OH (US)

(73) Assignee: Catacel, Corp., Ravenna, OH (US)

( * ) Notice: Subject to any disclaimer, the term of this patent is extended or adjusted under 35 U.S.C. 154(b) by 0 days.

(21) Appl. No.: 13/924,989

(22) Filed: Jun. 24, 2013

(65) Prior Publication Data
US 2013/0291383 A1 Nov. 7, 2013

Related U.S. Application Data

(62) Division of application No. 12/360,640, filed on Jan. 27, 2009, now Pat. No. 8,495,814.

(60) Provisional application No. 61/023,914, filed on Jan. 28, 2008.

(51) Int. Cl.
B21D 51/16 (2006.01)
B23P 6/00 (2006.01)
B23P 19/04 (2006.01)

(52) U.S. Cl.
USPC ............ 29/890; 29/890.031; 29/723; 29/244; 29/272; 29/282; 29/283; 29/284; 29/426.1; 29/426.3; 976/DIG. 244; 976/DIG. 252

(58) Field of Classification Search
CPC .... B25B 27/06; B23K 37/0435; B21D 53/02; G21C 19/207; G21C 3/38; B23P 15/26; B23P 19/024; G21Y 2002/302; G21Y 2004/50; G21Y 2004/501; B66C 1/54; B66C 1/56; B01J 8/002
USPC ........ 29/890.03, 890.031, 890.051, 723, 244, 29/270, 271, 272, 278, 281.1, 282, 890, 29/426.1, 426.3, 283, 284; 294/906, 93; 976/DIG. 244, DIG. 252; 376/260, 261
See application file for complete search history.

(56) References Cited

U.S. PATENT DOCUMENTS

| | | | | |
|---|---|---|---|---|
| 3,887,980 A | * | 6/1975 | Yates et al. | 29/723 |
| 4,452,478 A | * | 6/1984 | Dulaney | 294/86.28 |
| 4,715,111 A | * | 12/1987 | Kapoor et al. | 29/723 |
| 4,776,198 A | * | 10/1988 | Kerrey | 72/393 |
| 4,885,123 A | * | 12/1989 | Ikeuchi et al. | 376/233 |
| 4,886,635 A | * | 12/1989 | Forster et al. | 376/268 |
| 5,037,603 A | * | 8/1991 | Wood et al. | 376/260 |
| 6,920,920 B2 | | 7/2005 | Whittenberger | |

(Continued)

Primary Examiner — Sarang Afzali
(74) Attorney, Agent, or Firm — Pearne & Gordon LLP

(57) ABSTRACT

A reactor installation tool and method for installing a reactor unit in a reactor tube. A reactor installation tool including a movable assembly and a fixed assembly linked together such that the movable assembly can be adjusted relative to the fixed assembly. The movable assembly including a reactor sleeve attachment means for releasably securing a reactor sleeve loaded with a reactor unit to the tool. The fixed assembly including an expandable clamping unit for releasably securing the tool to a reactor tube. A reactor unit can be installed in the reactor tube by adjusting the movable assembly to extract the reactor unit from the reactor sleeve as the fixed assembly is rigidly secured to the reactor tube. The fixed assembly can be released from the reactor tube and the reactor installation tool can be removed from the reactor tube.

20 Claims, 9 Drawing Sheets

(56) References Cited

U.S. PATENT DOCUMENTS

| | | |
|---|---|---|
| 7,150,099 B2 | 12/2006 | Whittenberger et al. |
| 2006/0008414 A1 | 1/2006 | Retallick et al. |
| 2006/0019827 A1 | 1/2006 | Whittenberger |
| 2006/0228598 A1 | 10/2006 | Venkataraman et al. |
| 2006/0230613 A1 | 10/2006 | Whittenberger et al. |
| 2006/0245981 A1 | 11/2006 | Whittenberger et al. |
| 2006/0245982 A1 | 11/2006 | Whittenberger et al. |
| 2006/0263278 A1 | 11/2006 | Whittenberger et al. |
| 2007/0025893 A1 | 2/2007 | Whittenberger et al. |
| 2008/0145284 A1 | 6/2008 | Whittenberger et al. |

* cited by examiner

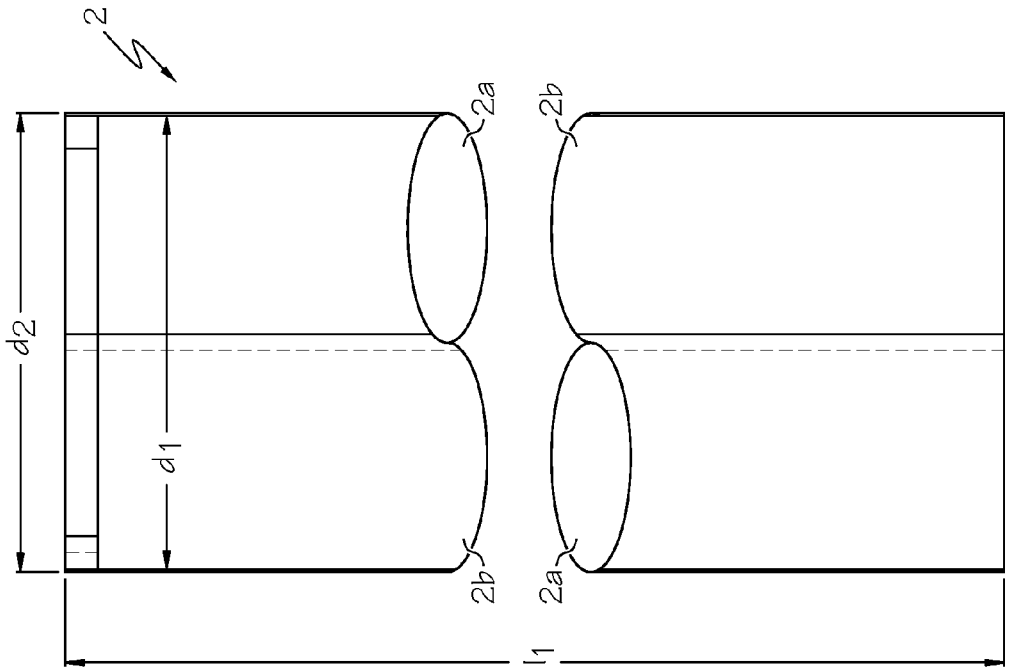
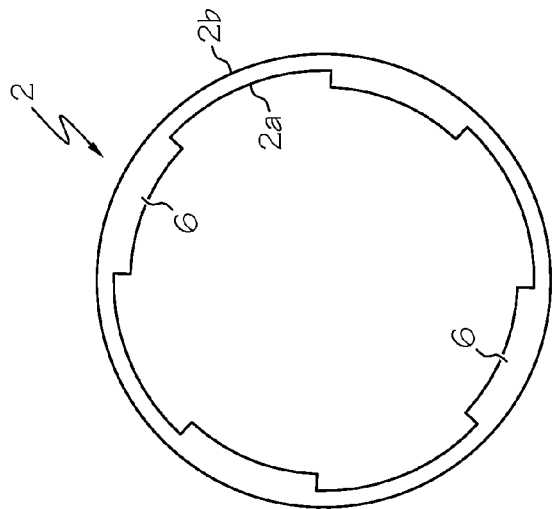
FIG. 15
FIG. 16

METHOD OF INSTALLING REACTOR UNITS

This application is a divisional of U.S. patent application Ser. No. 12/360,640, filed Jan. 27, 2009, now U.S. Pat. No. 8,495,814, which claims the benefit of U.S. Provisional Application No. 61/023,914, filed Jan. 28, 2008, all of which are incorporated herein by reference in their entirety.

FILED OF THE INVENTION

The present invention relates to a method of installing reactors, and the tools used to perform the same, and in particular, to a method of installing a reactor unit suitable for use in a reactor tube, and the tools used to perform the same.

BACKGROUND

Reactors, such as those used in the field of surface catalytic reactions and heat exchange, can fit within a reactor tube, which can transfer heat from the reactor tube to the interior of the tube or the reactor unit contained therein, or from the interior of the tube or reactor unit to the reactor tube. One example of a reactor unit is a stackable structural reactor, or SSR. One type of SSR is described in U.S. Pat. App. Pub. No. 2008/0145284. Other examples of reactor units include the disclosures in U.S. Pat. App. Pub. Nos. 2007/0025893, 2006/0263278, 2006/0245982, 2006/0245981, 2006/0230613, 2006/0228598, 2006/0019827 and 2006/0008414 and U.S. Pat. Nos. 7,150,099 and 6,920,920.

The reactor installation tools described herein can be used with any style of reactor, such as a cylindrical-shaped tube reactor as shown in the above-cited applications and patents. The reactors shown in the above-cited applications and patents, and others reactors of the prior art, can occupy substantially all of the space within a reactor tube and/or press firmly against the interior wall of the reactor tube. Installation of reactors can cause damage, such as denting portions of the reactors, for example, the fins of a reactor. Other damage can be caused, for example, scratching or bending the reactors, which can negatively affect performance, such as the heat transfer or reaction rate. Thus, there is a need to install a reactor or reactor unit in a reactor tube without damaging the reactor. The present inventors have found that the use of the reactor tools described herein can avoid damage to a reactor.

BRIEF SUMMARY OF THE INVENTION

A method of installing a rector unit, for instance in a reactor tube, that includes the steps of providing a reactor installation tool having an expandable clamping unit and a reactor sleeve attachment means. The method further includes attaching the reactor installation tool to a reactor sleeve using the reactor sleeve attachment means. The reactor sleeve is lowered into a reactor tube with the reactor installation tool and the expandable clamping unit is engaged to releasably secure the reactor installation tool to the reactor tube. The reactor sleeve attachment means is raised to raise the reactor sleeve in the reactor tube and the expandable clamping unit is released from inside the reactor tube. The reactor installation tool is removed from the reactor tube.

BRIEF DESCRIPTION OF THE DRAWINGS

The following figures illustrate various aspects of one or more embodiments of the present invention, but are not intended to limit the present invention to the embodiments shown.

FIG. 15 shows a cross-section view of an unloaded reactor sleeve.
FIG. 16 shows a top view of the unloaded reactor sleeve of FIG. 15.

DETAILED DESCRIPTION

As used herein, when a range such as 5-25 is given, this means at least 5 and, separately and independently not more than 25. Materials of construction for the reactor installation tool 1, or any component or part thereof, can include any suitable material, for example, metal, non-ferrous metal, metal foil, steel, stainless steel, alloys, non-metals such as plastics or glass, ceramic, or combinations thereof.

Figure 1:
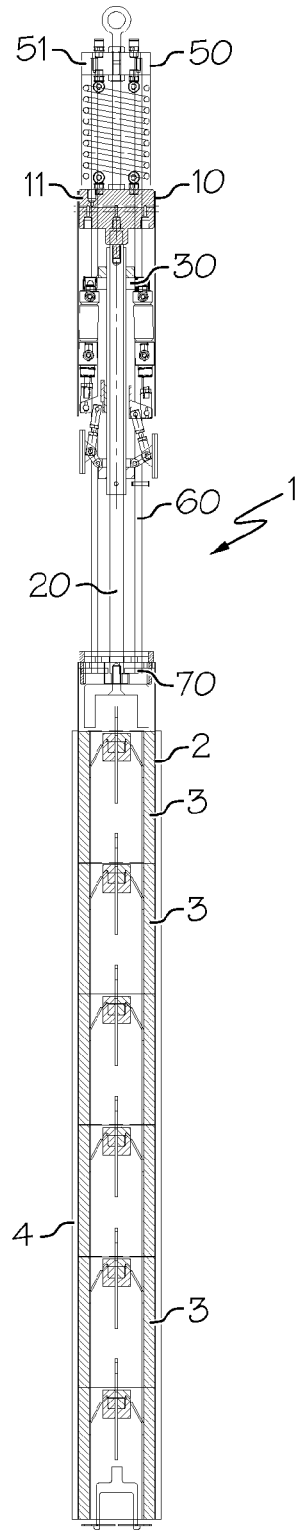
FIG. 1 shows a cross-section view of a reactor installation tool attached to a loaded reactor sleeve.

FIG. 1 shows a reactor installation tool 1. The reactor installation tool 1 includes a fixed assembly 10 and a movable assembly 50. The fixed assembly 10 can be attached to the movable assembly 50 such that the movable assembly 50 can be adjusted relative to the fixed assembly, for example, the movable assembly 50 can slidably move up and down the vertical axis of the fixed assembly 10. The fixed assembly 10 can include a lower manifold 11, a center post 20 and an expandable clamping unit 30. The movable assembly 50 can include an upper manifold 51, an exterior post unit 60 and a reactor sleeve attachment means 70. The fixed assembly 10 and movable assembly 50 are described in more detail below.

Figure 2:
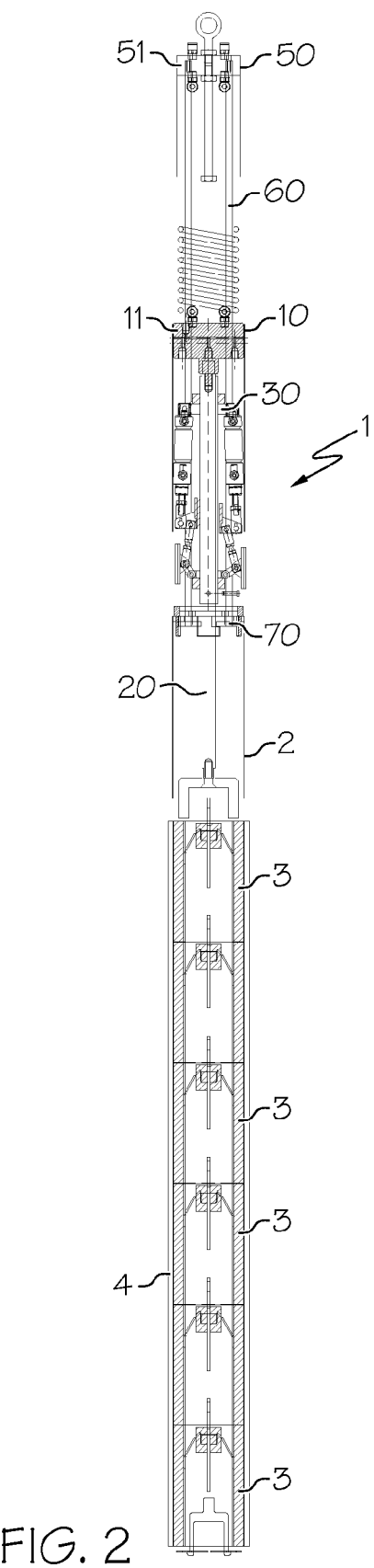
FIG. 2 shows a cross-section view of a reactor installation tool attached to an unloaded reactor sleeve.

The reactor installation tool 1 can be used to install one or more reactor units 3 in a reactor tube 4. As shown in FIG. 1, the reactor installation tool 1 is attached to a reactor sleeve 2 loaded with multiple reactor units 3 positioned in a stacked arrangement. The reactor sleeve 2 can be a tube, such as a hollow cylinder, of any diameter or length for accommodating one or more reactor units 3, which can be strung together or arranged in a stacked series in the reactor sleeve 2. The reactor sleeve 2 is described in more detail below with respect to FIGS. 15 and 16. In one example, the reactor sleeve 2 can be loaded with one reactor unit 3, wherein one or more reactor units 3 can be attached to the reactor unit 3 loaded in the reactor sleeve 2. The additional reactor units 3 attached to the loaded reactor unit 3 can hang freely outside of the interior portion of the reactor sleeve 2. As will be described below, such an arrangement of reactor units 3 can be installed in a reactor tube 4 such that the freely hanging reactor units 3 are positioned in the reactor tube 4 below the loaded reactor unit 3 being held in the reactor sleeve 2. The reactor sleeve 2 can be removed or extracted from the reactor tube 4 to leave a stacked arrangement of reactor units 3 and an unloaded reactor sleeve 2, As shown in FIG. 1, the reactor sleeve 2 loaded with one reactor unit 3 has been lowered in a reactor tube 4 such that the bottom reactor unit 3 of the stack of reactor units 3 rests on the bottom of the reactor tube 4, such as the pedestal. The top reactor unit 3 loaded in the reactor sleeve 2 is positioned near the top portion of the reactor tube 4. In this position, the reactor installation tool 1 is directly above the reactor tube 4 in line with the vertical axis of the reactor tube 4. The movable assembly 50 of the reactor installation tool 1 can be raised and lowered with the use of a hoist or other similar device as known in the art. A hoist can also be used for lowering and raising the tool 1 and/or reactor sleeve 2 in and out of a reactor tube 4. As shown in FIG. 1, the reactor installation tool 1 is in the seated or lowered position wherein the reactor sleeve 2 positioned in a reactor tube 4, encloses at least one reactor unit 3 or portion thereof. As shown in FIG. 2, the reactor installation tool 1 is in the raised or unloaded position wherein the one or more reactor units 3 loaded into the reactor sleeve 2 have been removed and are positioned in the reaction tube 4. Transitioning from the seated position to the unloaded position can be achieved by lifting up on the movable assembly 50 of the reactor installation tool 1, which allows the movable assembly 50 to be adjusted relative to the fixed assembly 10. Lifting up on the movable assembly 50 can raise the reactor sleeve 2 within the reactor tube 4 or extract the reactor sleeve 2 from the reactor tube 4. Preferably, lifting up of the movable assembly 50 extracts or removes the one or more reactor units 3 contained within the reactor sleeve 2 such that the one or more reactor units 3 remain within the reactor tube 4. The method of installing a reactor unit 3 is described in more detail below.

Figure 3:
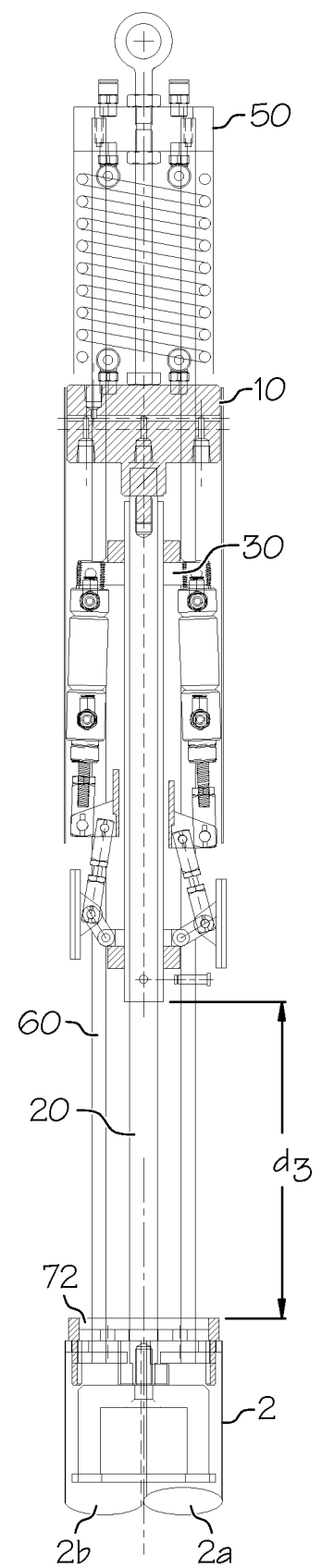
FIG. 3 shows a cross-section view of a reactor installation tool attached to a reactor sleeve.

FIG. 3 shows another cross-section view of a reactor installation tool 1 attached to a reactor sleeve 2 in an unloaded state, no reactor units 3 contained therein. As shown, the fixed assembly 10 and movable assembly 50 of the reactor installation tool 1 are slidably attached to one another such that the movable assembly 50 can travel or be adjusted a set distance ($d_3$), such as a stroke length, relative to the fixed assembly 10. For example, distance ($d_3$) can be measured from the bottom of the expandable clamping unit 30 to the top of the locking hub 72 of the reactor sleeve attachment means 70. Distance ($d_3$) can be set at any length as desired, for example, distance ($d_3$) can be matched to the reactor sleeve 2 length ($l_1$), or a distance greater than the reactor sleeve 2 length to ensure lifting the movable assembly 50 the entire distance ($d_3$) will extract the reactor sleeve 2 from enclosing one or more reactor units 3 secured therein. Extracting the reactor sleeve 2 from the one or more reactor units 3 contained therein allows a user to install a desired number of reactor units 3 in a reactor tube 4. Thus, as described below, the dimensions of the reactor sleeve 2 can be selected according to the size and number of reactor units 3 to be contained therein, or the size and dimensions of the reactor tube 4 being used, which may vary depending on the application, for example heat exchange and/or a catalytic reaction.

Figure 4:
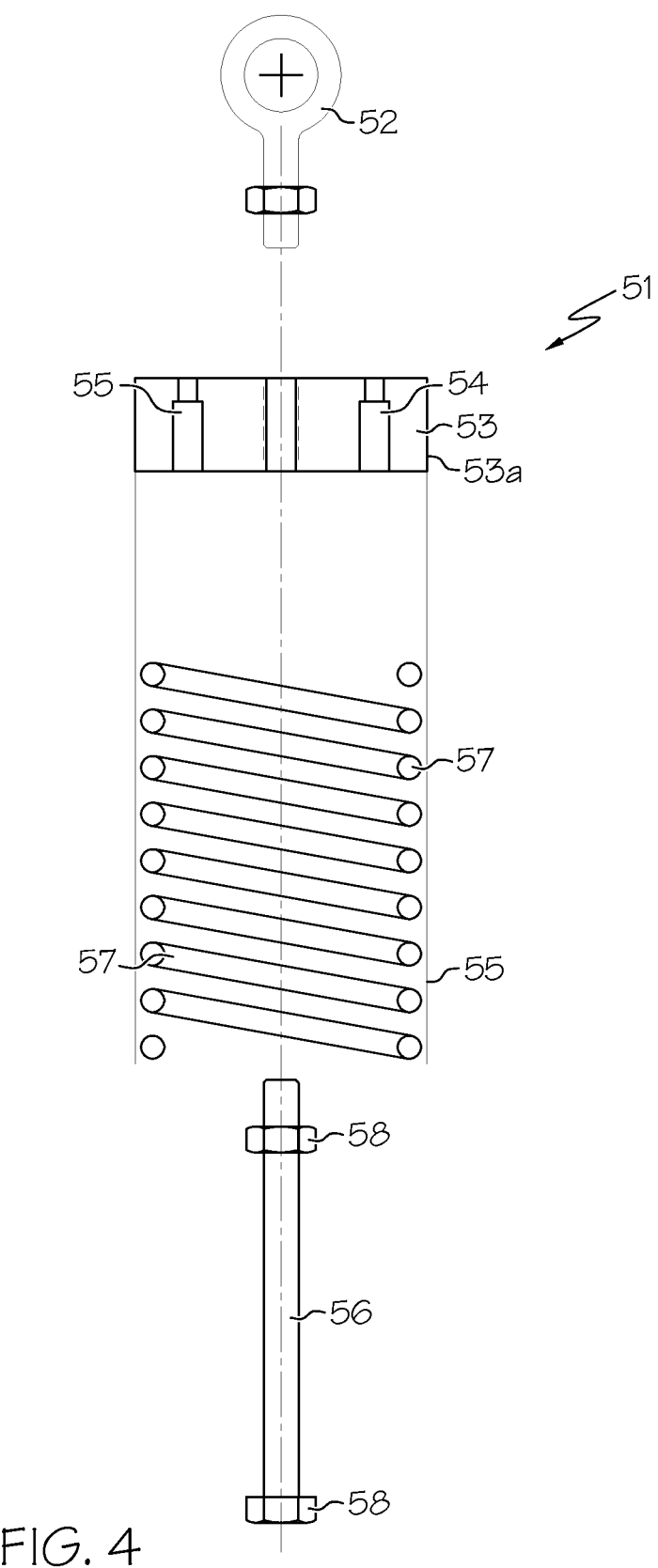
FIG. 4 shows an exploded cross-section view of an upper manifold of a reactor installation tool.

Turning to FIG. 4, an exploded cross-section view of the upper manifold 51 of a reactor installation tool 1 is shown. The upper manifold 51 can include a lifting means 52, such as an eye bolt or a hook. The lifting means 52 can be used to attach the upper manifold and/or reactor installation tool 1 to a device for raising and lowering, such as a hoist or similar mechanical machine. The lifting means 52 can be secured to the upper manifold 51 or portion thereof by any convention means, such as by welding or a male-female threaded attachment. The upper manifold 51 can include a base member 53. The base member 53 can be in the form of a circular disc having any desirable diameter or length, wherein the base member 53 has an outer surface face 53a. The base member 53 can have recesses or cavities 54, having any size or shape, for receiving one or more posts of the exterior post unit 60, the lifting means 52 and stop block 56. The one or more posts of the exterior post unit 60 can be attached to the base member 53, for example, fixedly attached by welding, or releasably attached with a male-female threaded arrangement. Thus, the recesses or cavities of the base member 53 can be used to rigidly mount the exterior post unit 60.

The upper manifold 51 can further include an upper manifold guard 55. The upper manifold guard 55 can be attached to the outer surface face 53a of the base member 53, for example, by welding. The upper manifold guard 55 can be a hollow cylinder for enclosing and protecting the stop block 56 and/or any electrical, pneumatic or hydraulic components, such as pressurized air supply lines or hose coils 57. The upper manifold guard 55 can have any suitable diameter and/or length depending on the size and shape of the stop block 56 and/or other components to be contained therein. As shown in FIG. 4, the upper manifold 51 can further include a stop block 56, such as an elongated shaft with one or more washers located along the length of the shaft, such at both the distal and proximal ends of the shaft. The stop block 56 can be used to rest the upper manifold 51 on the top face of the fixed assembly 10, for example the top face of the primary member 12. The stop block 56 can have a washer 58 at its proximal end for resting on the top face of the fixed assembly 10, thereby preventing the movable assembly 50 from moving downward.

Figure 5:
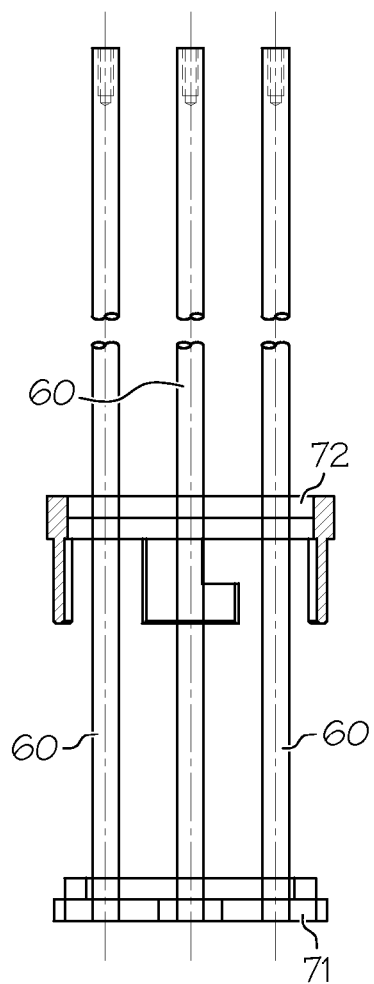
FIG. 5 shows a cross-section view of an exterior post unit of a reactor installation tool.

Turning to FIG. 5, a cross-section view of a 4-post exterior post unit 60 of a reactor installation tool 1 is shown. The exterior post unit 60 can include one or more posts, such as the 4-post arrangement as shown in FIG. 5, which can be spaced around a center post 20 of the fixed assembly 10 (not shown). The exterior post unit 60 can provide structural integrity and stability to the movable assembly 50. For example, the exterior post unit 60 can prevent or reduce the stress and/or force generated during installation of a reactor unit 3 from damaging the movably assembly 50. As shown, a 4-post arrangement stabilizes the movable assembly 50 during twisting, such as the twisting encountered by securing the reactor sleeve attachment means 70 to the reactor sleeve 2 as described below. The exterior post unit 60 can also act as a guide for raising and lowering the movable assembly 50 during installation of a reactor unit 3 in a reactor tube 4. The movable assembly 50 can be slidably attached to the fixed assembly 10, and thus the movable assembly 50 can move in the vertical direction along the vertical axis of the fixed assembly 10. For example, the posts of the exterior post unit 60 can pass though openings in the lower manifold of the fixed assembly 10 that guide the movable assembly 50 in a linear path as it is adjusted relative to the fixed assembly 10. The posts of the exterior post unit 60, fixed in position through the openings in the lower manifold 11 of the fixed assembly 10, ensure the movable assembly 50 does not bend or twist during movement.

Figure 6:
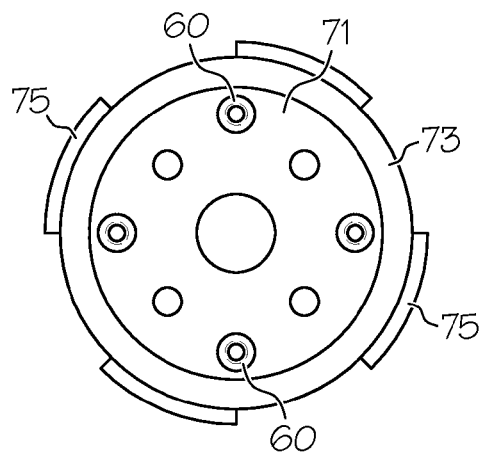
FIG. 6 shows a top view of the exterior post unit of FIG. 5.
Figure 7:
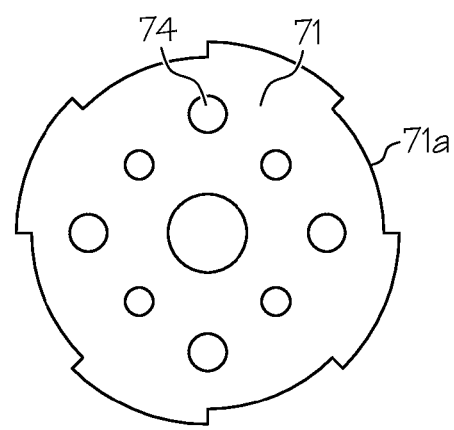
FIG. 7 shows a top view of a centering spider plate of the exterior post unit of FIG. 5.

One end of the posts of the exterior post unit 60 can be attached to the base member 53 of the upper manifold 51 by any conventional method, such as a male-female threaded attachment or by welding. Although not shown in FIG. 5, the distal ends of the posts can be attached to the base member 53, for example the distal ends can mate with the through holes 54 in the base member 53. The proximal end of the posts can be attached to the reactor sleeve attachment means 70. The reactor sleeve attachment means 70 can include a centering spider plate 71 and a locking hub 72. The centering spider plate 71 can be a circular disc having cavities or through holes 74 for securing or receiving the one or more posts of the exterior post unit 60. The centering spider plate 71 can be fixedly attached to the one or more posts of the exterior post unit by welding, or with releasably attached by a threaded fitting as shown. FIG. 6 shows a top view of the centering spider plate 71 having ring 73 mounted on the top face of the centering spider plate. Radial cogs 75 can extend from the outer surface face 71*a* of the centering spider plate 71 and have a radiused design, for example, a radius similar to the outer circumference of the centering spider plate 71. The radial cogs 75 can be spaced about the outer surface face 71 *a*, such as equally spaced along the centering spider plate 71 outer circumference. Preferably, the radial cogs 75 have a thickness equal to that of the centering spider plate 71. The radial cogs 75 can be an integral part of the centering spider plate 71, or alternatively, be secured to the outer surface face 71 *a* by any conventional means, such as by welding. One or more radial cogs 75 can be arranged and/or sized to engage the radial cogs 6 of the reactor sleeve 2. In this regard, the exterior post unit 60 of the movable assembly 50 can be releasably secured or attached to the reactor sleeve 2 by the centering spider plate 71, as described below.

The radial cogs 75 of the centering spider plate 71 can slide through the openings between the radial cogs 6 of the reactor sleeve 2 such that the reactor sleeve 2 can be moved upward along the vertical axis line of the movable assembly 50. Once the radial cogs 6 of the reactor sleeve 2 clear the top surface of the radial cogs 75 of the centering spider plate 71, and are positioned freely above the cogs 75, the reactor sleeve 2 can be twisted to adjust the radial cogs 6 of the reactor sleeve 2 to be directly above the radial cogs 75 of the centering spider plate 71. In this position the reactor sleeve 2 can rest on the centering spider plate 71 because the radial cogs 6 of the reactor sleeve 2 can rest directly on and be in contact with the radial cogs 75 of the centering spider plate 71, which also aligns the openings between both sets of radial cogs 6, 75. The method of twisting the reactor sleeve 2 can also be reversed in that the reactor installation tool 1 can be twisted to rotate the centering spider plate 71 to align the set of radial cogs 6, 75, which does not require the reactor sleeve 2 to be twisted.

With both sets of radial cogs 6, 75 being in register, to ensure that inadvertent twisting or movement that may occur during installation does not dislodge the cogs from the stacked position, a locking hub 72 can be used to fix the cogs 6, 75 position during installation of a reactor unit 3. The locking hub 72, as shown in FIG. 5, can be a circular plate having locking cogs 77 that can be aligned with the open spaces between the radial cogs 75 of the centering spider plate 71. The locking hub 72 can be slidable along the posts of the exterior post unit 60 such that the locking hub 72 can be moved downward to position the locking cogs 77 between the radial cogs 75 of the centering spider plate 71. In the case the radial cogs 75 of the centering spider plate 71 are aligned with the radial cogs 6 of the reactor sleeve 2, the locking cogs 77 preferably are positioned further downward between the cogs 6 of the reactor sleeve 2. The locking hub 72 can be twisted to lock the reactor sleeve 2 and movable assembly 50 together to prevent rotation with respect to one another during installation. A pin can be inserted through a portion of the locking hub 72 and centering spider plate 71 to ensure the two components do not twist, rotate or disengage during installation. In this arrangement, the locking cogs 77 and pin prevent the reactor sleeve 2 and reactor installation tool 1 from twisting and thus the reactor sleeve 2 is releasably locked to the movable assembly 50 of the reactor installation tool 1. To separate the units, the locking hub 72 can be twisted and moved upward to slide the locking cogs 77 from the openings between the sets of radial cogs 6, 75. Twisting can detach the reactor sleeve 2 from the reactor sleeve attachment means 70.

Figure 8:
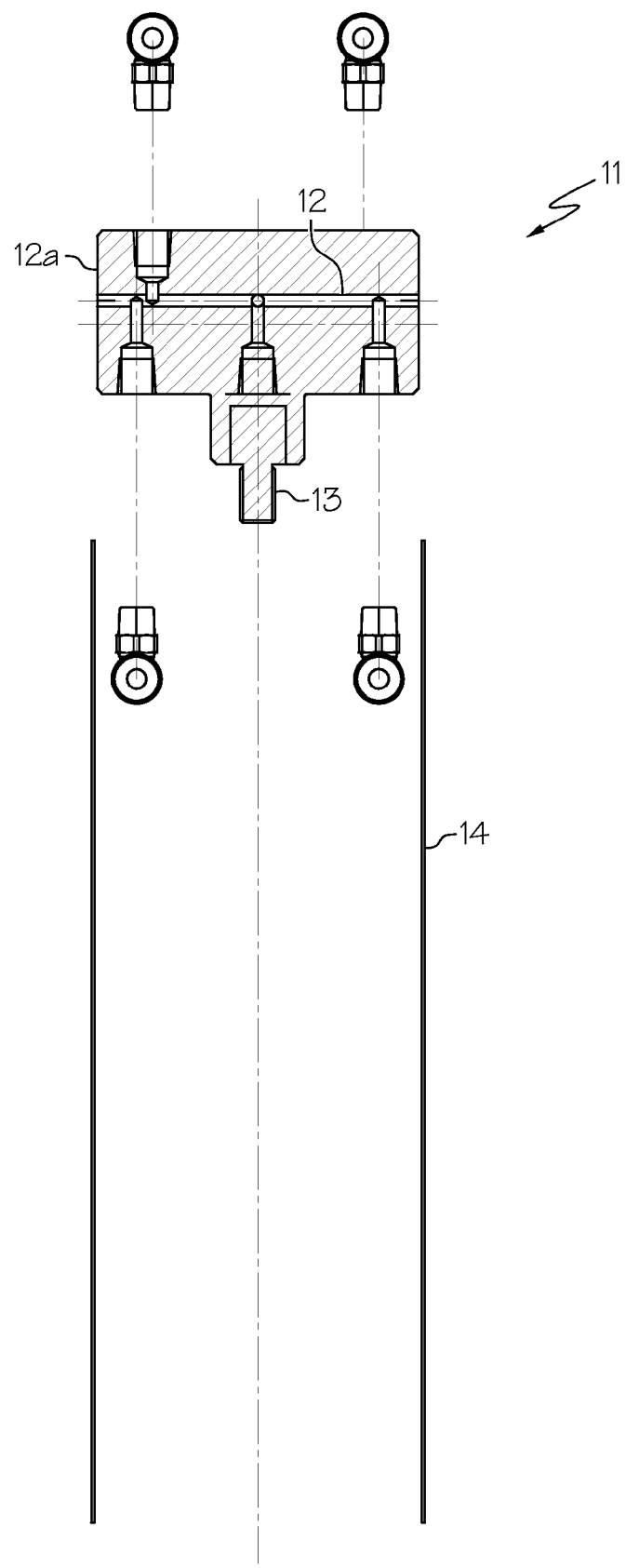
FIG. 8 shows an exploded cross-section view of a lower manifold of a reactor installation tool.

Turning to FIG. 8, an exploded cross-section view of a lower manifold 11 of a reactor installation tool 1 is shown. The lower manifold 11 can include a primary member 12. The primary member 12 can be a circular disc having any desirable diameter or length, wherein the primary member 12 has an outer surface face 12*a*. The primary member 12 can have through holes or openings for receiving one or more posts of the exterior post unit 60. Preferably, the through holes in the primary member 12 have a suitable diameter for allowing the posts to freely slide therethrough as the movable assembly 50 is adjusted relative to the fixed assembly 10. The primary member 12 can have a protrusion 13 extending from the bottom face. The protrusion 13 can mate with the center post 20 of the fixed assembly 10, for example, via a threaded attachment or the like. The center post 20 can be securely attached to the primary member 12 to create a rigid structure for mounting the expandable clamping unit 30.

The primary member 12 can further include a lower manifold guard 14. The lower manifold guard 14 can be attached to the outer surface face 12*a* of the primary member 12, for example, by welding. The lower manifold guard 14 can be a hollow cylinder for enclosing and protecting the expandable clamping unit 30. The lower manifold guard 14 can have any suitable diameter and/or length depending on the size and shape of the expandable clamping unit 30 and/or other components to be contained therein. Preferably, the lower manifold guard 14 does not extend past the intermediate mounting bracket 32, nor cover the movable clamp shoes 34 of the expandable clamping unit 30. During use, the clamp shoes 34 are expanded outward beyond the exterior of the lower manifold guard 14 to contact the inner surface face of a reactor tube 4. Thus, it is desirable that the lower manifold guard 14 does not impede the clamp shoe 34 movement or prevent the clamp shoe 34 from being firmly pressed on the reactor tube 4.

Figure 9:
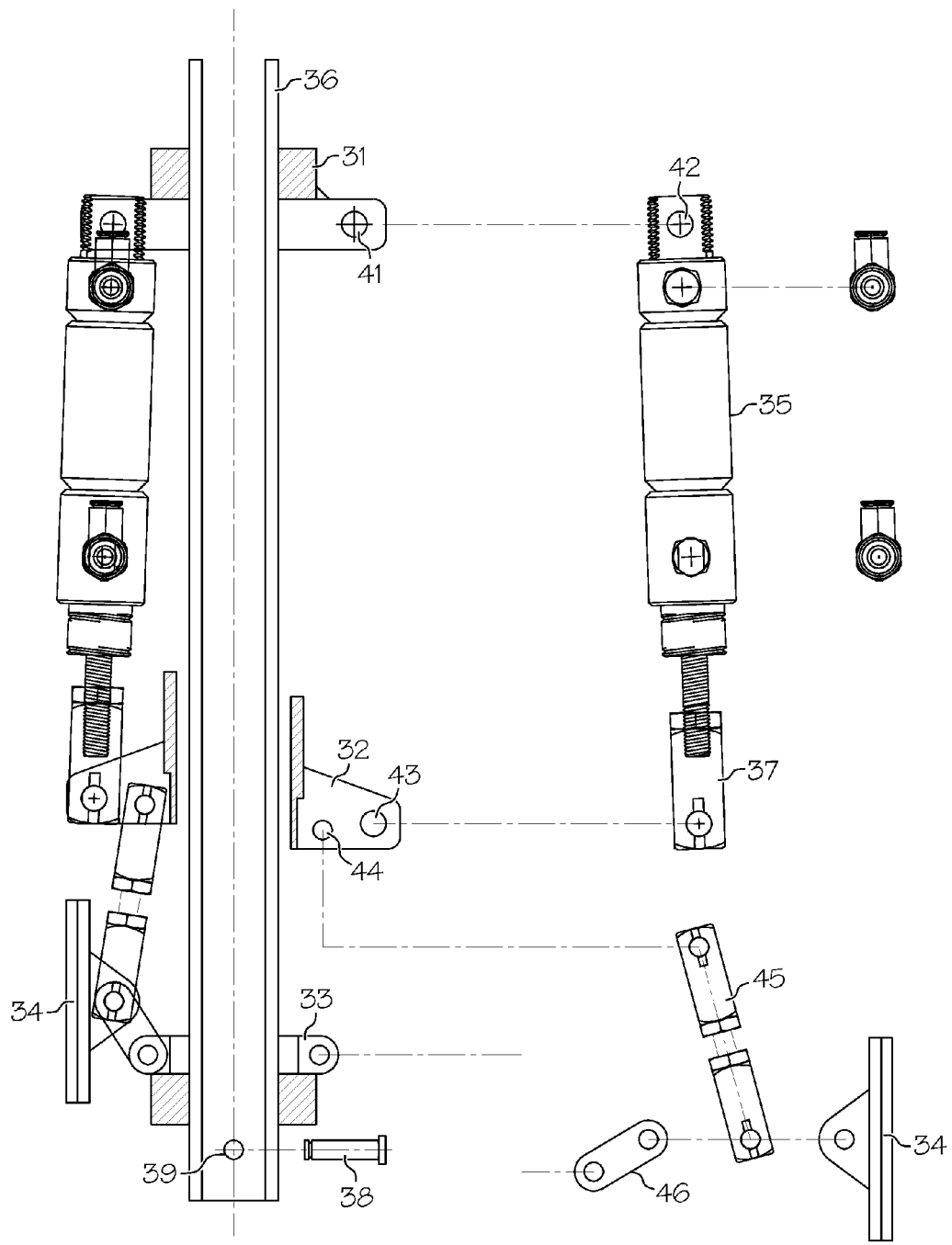
FIG. 9 shows an exploded cross-section view of an expandable clamping unit of a reactor installation tool.

FIG. 9 shows an expandable clamping unit 30. The expandable clamping unit 30 can have a mounting sleeve 36 for fitting with the center post 20. The mounting sleeve 36 is an elongated body having a hollow through hole for receiving the center post 20. The through hole of the mounting sleeve 36 extends from the distal to proximal end of the sleeve 36. The mounting sleeve 36 can be secured at any position on the center post 20, for example, with a locking pin 38. A locking pin hole 39 can be drilled in the mounting sleeve 36, and when aligned with a hole in the center post 20, the locking pin 38 can secure the expandable clamping unit 30 on the center post 20 and prevent the two components from sliding with respect to one another during operation. Although not shown, multiple locking pins 38 can be used to secure the expandable clamping unit 30 on the center post 20.

The mounting sleeve 36 can have one or more mounting brackets for securing the components of the expandable clamping unit 30. As shown in FIG. 9, the mounting sleeve 36 can have an upper mounting bracket 31, an intermediate mounting bracket 32 and a lower mounting bracket 33. The upper mounting bracket 31 is rigidly secured to the mounting sleeve 36, preferably near the top of the sleeve. The upper mounting bracket 31 connects to the distal end of a pneumatic cylinder 35 having a mounting hole 42 that can align and be in register with the mounting hole 41 in the upper mounting bracket 31. A pin or similar device can be used to secure the pneumatic cylinder 35 to the upper mounting bracket 31. The proximal end of the pneumatic cylinder 35 is secured to the intermediate mounting bracket 32. The proximal end of the pneumatic cylinder 35 can have a slotted member 37 for mating with the mounting pin passing through hole 43 in the intermediate mounting bracket 32. The position of the slotted member 37 on the proximal end of the intermediate mounting bracket 32 can be adjusted by twisting the slotted member 37 on the threaded attachment. The intermediate mounting bracket 32 can have another through hole for attaching a clamp shoe 34. Adjustable connector 45 can link clamp shoe 34 to the intermediate mounting bracket 32, and fixed connector 46 can link the clamp shoe 34 to the lower mounting bracket 33, which is rigidly secured to the mounting sleeve 36, preferably near the bottom of the sleeve. In this arrangement, the clamp shoe 34 is movably attached to the mounting sleeve 36 such that the clamp shoe 34 can extend away from and retract towards the sleeve 36. As shown, the clamp shoe 34 is movably attached to the mounting sleeve 36 by, in part, the fixed connector 46 and pneumatic cylinder 35.

Figure 10:
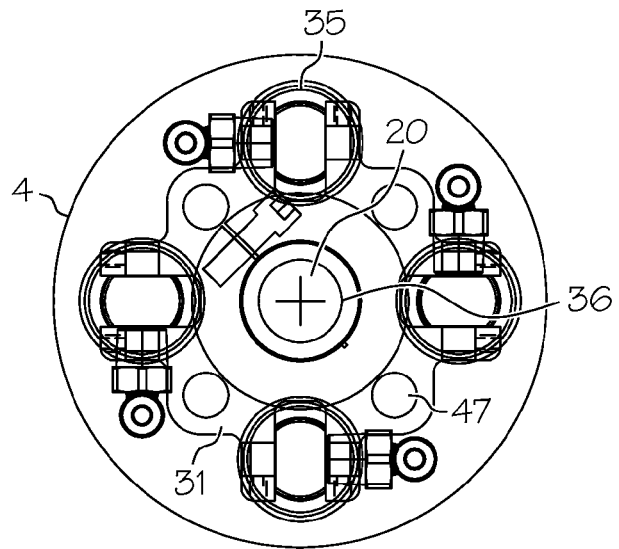
FIG. 10 shows a top view of the expandable clamping unit of FIG. 9.
Figure 11:
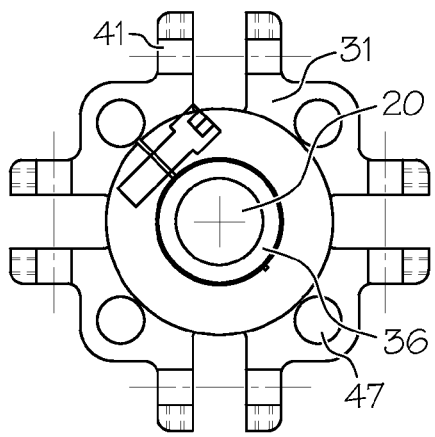
FIG. 11 shows a top view of the mounting sleeve of the expandable clamping unit of FIG. 9.

FIG. 11 shows a top view of the upper mounting bracket 31, without being attached to a pneumatic cylinder 35. As shown, the upper mounting bracket 31 has four mounting sites, each equally spaced around the mounting sleeve 36, 90° apart. Although not shown, the mounting sleeve 36 can have 2, 3 or more sets of mounting brackets (upper, lower and intermediate), and corresponding components, spaced around the sleeve 36. Each mounting site has a mounting hole 41 for connecting one pneumatic cylinder 35 as described above. The upper mounting bracket 31 can have one or more through holes 47 for receiving posts of the exterior post unit 60. The through holes 47 allow the posts of the exterior post unit 60 to freely slide up and down during operation. FIG. 10 shows a top view of the upper mounting bracket 31 secured to four pneumatic cylinders 35 positioned inside a reactor tube 4. The distal ends of the pneumatic cylinders 35 are attached to the mounting sites of the upper mounting bracket 31 with pins passing through the mounting hole 41 in the bracket 31 and the mounting hole 42 in the cylinder 35, shown in FIG. 9.

Pressurized air supply lines or hoses can be run to the pneumatic cylinders 35 of the expandable clamping unit 30 for expanding and contracting the clamp shoes 34 of the unit. As described above, components of the upper manifold 51 and lower manifold 11, such as the base member 53 and primary member 12, can be designed to function as multi-port air manifolds to simplify pneumatic plumbing. For example, one or multiple through holes can be utilized in the various components of the upper manifold 51 and/or lower manifold 11. Complex plumbing, such as multiple tubes, can be guided through one through hole or be combined into one hose for passing through the length of the reactor installation tool 1 to the source to be energized, such as the pneumatic cylinder 35. Electrical, hydraulic, or air supply lines can be run to various components with ease, and with less risk of tangling. For example, to operate the pneumatic cylinders 35, air supply lines can be joined together and plumbed from the top of the reactor installation tool 1 to the site of the expandable clamping unit 30.

Energizing the pneumatic cylinders 35 with air pressure can force the cylinders 35 to expand in length, which moves the clamp shoes 34 of the expandable clamping unit 30 outward. The clamp shoes 34 can be forced away from the center post 20 and into contact with the inner surface face of a reactor tube 4 when the pneumatic cylinders 35 are energized with air. A pressurized air supply can be used to firmly press the clamp shoes 34 against a reactor tube 4. Depending on the pressure of air used, the amount of force pressing the clamp shoe 34 on the reactor tube 4 can be controlled. Preferably, a sufficient air pressure is used to press the clamp shoes 34 against a reactor tube 4 to prevent slip between the reactor tube 4 and clamp shoe 34. For example, an electrically operated air valve can be used to supply air at a pressure of 85 psig to the pneumatic cylinders 35. Slippage between the clamp shoe 34 and reactor tube 4 can be caused by many factors, such as available air pressure, reactor tube 4 size (diameter), and the type and cleanliness of the surfaces being used. For example, if the inner surface face of a reactor tube 4 is dirty or covered in grease or residual oils, slippage can occur more easily. To reduce risk of slippage, all surfaces of the reactor tube 4 and clamp shoe 34 should be cleaned before operation.

Figure 12:
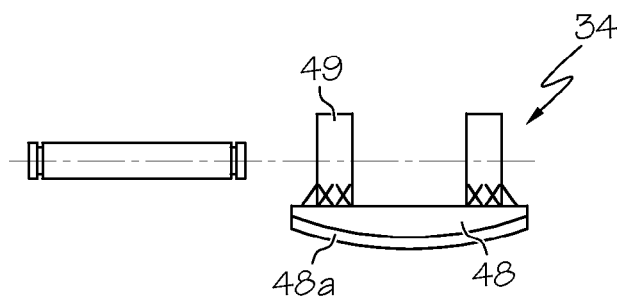
FIG. 12 shows a top view of a clamp shoe of the expandable clamping unit of
FIG. 9.

An example clamp shoe 34 is shown in FIG. 12. The clamp shoe 34 can have two faces, one face being in contact with a mounting base 49 and the other face being suitable for pressing against a reactor tube 4 wall. As shown, the clamp shoe 34 can include a mounting base 49 for attaching the clamp shoe 34 to the adjustable connector 45 and fixed connector 46, which can be further attached to the intermediate mounting bracket 32 and lower mounting bracket 33. The mounting base 49 can have a pin hole for receiving a locking pin for securing the adjustable connector 45 and fixed connector 46 to the clamp shoe 34. The clamp shoe 34 can have a pressing pad 48. The pressing pad 48 contacts the surface to which the reactor installation tool 1 is to be attached. Thus, depending on the dimensions of the surface to be contacted, the pressing pad 48 can be designed to have any suitable shape and size. For example, the pressing pad 48 can have a radiused face that corresponds to the curvature of the surface the pad 48 is to be pressed against, such as the inner surface face of a reactor tube 4 or reactor sleeve 2. As shown, the pressing pad 48 has a curved face for contacting the inner surface face of a reactor tube. The pressing pad 48 can be made of any suitable material, such as rubber (natural or synthetic), polymers, rigid foam, or metal. Optionally, the pressing pad 48 can further include contacting layer 48a overlying its face. The contacting layer 48a can be secured to the pressing pad 48 with an adhesive. The contacting layer 48a can provide a protecting interface during operation. The contacting layer 48a can be made of a pliable or softer material than that of the underlying pressing pad 48, for example, foam, rubber (natural or synthetic), polymer and the like, or combinations thereof. The pressing pad 48 without the contacting layer 48a, or the contacting layer 48a, if present, can have various surface textures to accommodate the surface conditions encountered. The surface texture of the pressing pad 48 and contacting layer 48a can also reduce slippage during operation.

Figures 13, 14:
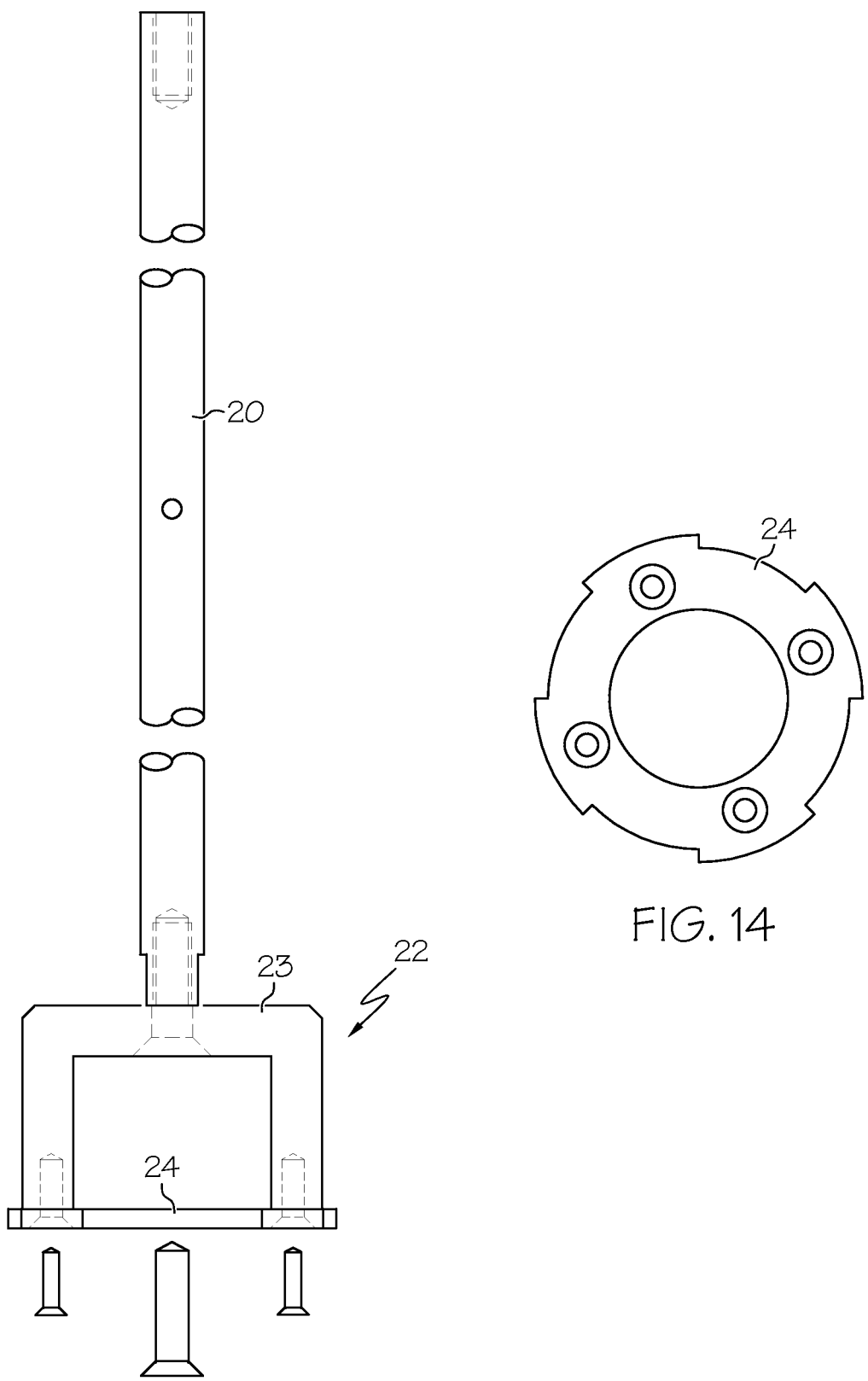
FIG. 13 shows a cross-section view of a center post of a reactor installation tool.
FIG. 14 shows a top view of an anvil disc of the center post of FIG. 13.

Turning to FIG. 13, there is shown a center post 20 connected to a stationary end stop 22. The stationary end stop 22 can function as a stop for a reactor unit 3, or multiple reactor units 3 if stacked. As described herein, as the movable assembly 50 is adjusted upward relative to the fixed assembly 10, the reactor sleeve 2 is also lifted equi-distance with the movable assembly 50. To ensure that the reactor unit 3, or series of stacked reactor units 3, is not lifted with the reactor sleeve 2, the stationary end stop 22 prevents the one or more reactor units 3 from moving with the movable assembly 50. Thus, the reactor sleeve 2 is extracted and the reactor units 3 are positioned in the reactor tube 4.

The stationary end stop 22 can be a plate, or as shown, include an anvil 23 and an anvil disc 24. The anvil 23 can have any suitable diameter, for example, a diameter less than that of the reactor sleeve 2 and/or reactor tube 4 such that the anvil 23 can be inserted into the interior space of the sleeve 2 or tube 4 during operation, as shown in FIGS. 1 and 2. The anvil 23 can be attached to one end of the center post 20 by conventional means, such as with a threaded screw as shown. The anvil 23 can have attached to the bottom surface an anvil disc 24. The anvil disc 24 can be a circular ring having an empty center. Preferably, the circular ring is dimensioned to fit against the bottom face of the anvil 23 such that substantially the entire bottom face surface of the anvil 23 is covered by the anvil disc 24.

As shown in FIG. 14, the anvil disc 24 can have radial cogs 25 extending from the outer face 24a, wherein the radial cogs 25 can have a radiused design, for example, a radius similar to the outer circumference of the anvil disc 24. The radial cogs 25 can be spaced about the outer surface face 24a, such as equally spaced along the anvil disc 24 outer circumference. The radial cogs 25 can be an integral part of the anvil disc 24, or alternatively, secured to the outer surface face 24a by any conventional means, such as by welding. One or more radial cogs 25 can be arranged and/or sized to engage the radial cogs 6 of the reactor sleeve 2. In this regard, the center post 20 of the fixed assembly 10 can be releasably secured or attached to the reactor sleeve 2 by the stationary end stop 22. That is, the radial cogs 25 of the anvil disc 24 can slide through the openings between the radial cogs 6 of the reactor sleeve 2 such that the reactor sleeve 2 can be moved upward along the vertical axis line of the fixed assembly 10. Once the radial cogs 6 of the reactor sleeve 2 clear the top surface of the radial cogs 25 of the anvil disc 24, and are positioned freely above the cogs 25, the reactor sleeve 2 can be twisted to adjust the radial cogs 6 of the reactor sleeve 2 to be directly above the radial cogs 25 of the anvil disc 24, as similarly described above with regard to the centering spider plate 71.

As described above, the inner surface face 2a of the reactor sleeve 2 can have one or more radial cogs 6, see FIG. 16. A radial cog 6 can extend from the inner surface face 2a towards the interior of the reactor sleeve 2 and have a radiused design, for example a radius similar to the inner circumference of the reactor sleeve 2. The radial cogs 6 can be spaced about the inner surface face 2a, such as equally spaced along the reactor sleeve 2 inner circumference. The radial cogs 6 can be secured to the inner surface face 2a of the reactor sleeve 2 by any conventional means, such as by welding. The one or more radial cogs 6 can be positioned at any point along the length ($l_1$) of the reactor sleeve 2. For example, the radial cogs 6 can be positioned near the top portion of the inner surface face 2a of the reactor sleeve 2. The radial cogs 6 can be arranged and/or sized to engage radial cogs of other components of the reactor installation tool 1, for example, a radial cog 75 of the reactor sleeve attachment means 70. In other words, the reactor installation tool 1 can be releasably secured or attached to a reactor sleeve 2 by the reactor sleeve attachment means 70 of the movable assembly 50. Attaching the reactor sleeve 2 to the movable assembly 50 is described above.

As shown in FIG. 15, a reactor sleeve 2 can have any length ($l_1$), for example, but not limited to, in the range of 1 to 100, 1 to 50, 1 to 25, 1 to 20, 1 to 15, 1 to 10, or 1 to 5 inches. A reactor sleeve 2 can have any inner diameter ($d_1$), for example, but not limited to, in the range of 1 to 50, 1 to 25, 1 to 20, 1 to 15, 1 to 10, 1 to 5, or 1 to 3 inches. A reactor sleeve 2 can have any outer diameter ($d_2$), for example, but not limited to, in the range of 1 to 50, 1 to 25, 1 to 20, 1 to 15, 1 to 10, 1 to 5, or 1 to 3 inches. In the case the reactor sleeve 2 is a tube, such as a hollow cylinder, the reactor sleeve 2 can have an inner diameter ($d_1$), an outer diameter ($d_2$), an inner surface face 2a, an outer surface face 2b and a length ($l_1$). The inner surface face 2a of the reactor sleeve 2 faces the interior of the tube, which can hold a reactor unit 3, whereas the outer surface face 2b of the reactor sleeve 2 faces the exterior of the tube, for example, towards a reactor tube 4 surrounding or enclosing the reactor sleeve 2. The inner surface face 2a of the reactor sleeve 2 can be in direct contact with a reactor unit 3 or a portion thereof. The outer surface face 2b of the reactor sleeve 2 can be in direct contact with a reactor tube 4 or portion thereof. For ease of inserting the reactor sleeve 2 into the reactor tube 4, some clearance between the outer surface face 2b and reactor tube 4 is preferable.

The reactor sleeve 2 can have a sufficient diameter to fit within the reactor tube 4 and hold one or more reactor units 3. The reactor units 3 can be compressed to fit in the reactor sleeve 2 such that when the reactor sleeve 2 is removed, the reactor unit 3 expands outward from its center, or uncompresses, and presses against the reactor tube 4 wall. Preferably, the reactor unit 3 presses against the reactor tube 4 wall with enough force that the reactor unit 3 remains in its installed position during operation. As noted above with regard to FIGS. 1 and 2, the reactor unit 3 loaded inside the reactor sleeve 2 can have multiple reactor units 3 hanging below the loaded reactor sleeve 2. The hanging reactor units 3 can be in a compressed form, for example, having tension bands positioned around the exterior of each hanging reactor unit 3. The tension bands can be temperature sensitive such that during operation the tension bands break or melt when exposed to elevated temperatures. In this arrangement, the reactor unit 3 loaded inside the reactor sleeve 2 is installed near the top of the reactor tube 4, and when the reactor sleeve 2 is removed and the reactor unit 3 releases and presses against the reactor tube 4 wall, the top reactor unit 3 can support the remaining hanging reactor units 3. During operation the hanging reactor units 3 can break the tension bands and expand to press against the reactor tube 4 wall, wherein the top reactor unit 3 that was unloaded from the reactor sleeve 2 no longer needs to support the reactor units positioned below it.

A method of installing a reactor unit 3 with a reactor installation tool 1 will now be described. A reactor installation tool 1 including a fixed assembly 10 with an expandable clamping unit 30 and a movable assembly 50 with a reactor sleeve attachment means 70 can be releasably attached to a reactor sleeve 2. The fixed assembly 10 is preferably slidably attached to the movable assembly 50. The reactor sleeve attachment means 70 can include a centering spider plate 71 having radial cogs 75 and a locking hub 72. The centering spider plate 71 can be inserted into the interior space of the reactor sleeve 2 by aligning the radial cogs 75 with the open space between the radial cogs 6 of the reactor sleeve 2. Twisting the reactor sleeve 2 or centering spider plate 71 can align the cogs 75, 6 and then the locking hub 72 can be lowered, twisted, and locked with pin to prevent the reactor installation tool 1 and reactor sleeve 2 from twisting with respect to one another. In this arrangement, the movable assembly 50 of the reactor installation tool 1 is releasably attached to the reactor sleeve 2.

The reactor sleeve 2, preferably loaded with one or more reactor units 3, can be lowered or positioned into a reactor tube 4 by using a hoist or similar device connected to the reactor installation tool 1. The reactor tube 4 preferably has a diameter greater than the reactor sleeve 2 diameter, and the largest diameter point of the portion of the reactor installation tool 1 to be lowered into the reactor tube 4. Once lowered into the reactor tube 4, the reactor sleeve 2 is preferably positioned below the top surface of the reactor tube 4 such that sufficient space near the top of the reactor tube 4 is left uncontacted by the reactor sleeve 2. In this arrangement, the reactor units 3 can be installed in the reactor tube 4 below the location of the expandable clamping unit 30. The uncontacted portion of the inner surface face of the reactor tube 4 is available for contact with the clamp shoes 34 of the expandable clamping unit 30, for example, the clamp shoes 34 of an expandable jaw unit including a mounting sleeve, wherein the mounting sleeve can be movably attached to one or more clamp shoes 34. The clamp shoes 34 can have a pressing pad for contacting or engaging the inner surface face of the reactor tube 4.

The expandable clamping unit 30 can be engaged by energizing the unit 30 with a pressurized air source. A pressurized air source can expand and contract the clamp shoes 34 of the expandable clamping unit 30, the movement of the clamp shoes 34 being relative to the center axis of the reactor installation tool 1 and/or mounting sleeve 36 of the expandable clamping unit 30. The clamp shoes 34 can be expanded outward from the mounting sleeve 36 to contact the inner surface face of the reactor tube 4, and thus releasably securing the reactor installation tool 1, and in particular the fixed assembly 10, to the reactor tube 4. The reactor installation tool 1 is releasable secured because the expandable clamping unit 30 can be de energized by the user when it is desirable to release the clamp shoes 34. The movable assembly 50 of the reactor installation tool 1 can then be raised relative to the fixed assembly 10 to lift the reactor sleeve 2 in the reactor tube 4. The reactor sleeve attachment means 70 moves upward with the reactor sleeve 2 to extract the sleeve 2 from the one or more reactor units 3 enclosed therein. The expandable clamping unit 30 can be de-energized with the pressurized air source to retract the clamp shoes 34 from the inner surface face of the reactor tube 4, thereby releasing the fixed assembly 10 of the reactor installation tool 1 from the reactor tube 4. The reactor installation tool 1, and empty or unloaded reactor sleeve 2 attached thereto, can be removed from the interior space of the reactor tube 4. The reactor tube 4 is now loaded with the one or more reactor units 3 that were held by the reactor sleeve 2.

While various embodiments in accordance with the present invention have been shown and described, it is understood the invention is not limited thereto, and is susceptible to numerous changes and modifications as known to those skilled in the art. Therefore, this invention is not limited to the details shown and described herein, and includes all such changes and modification as encompassed by the scope of the appended claims.

What is claimed is:

1. A method of installing a reactor unit, said method comprising the step of:
    providing a reactor installation tool, said reactor installation tool comprising an expandable clamping unit and a reactor sleeve attachment means;
    attaching said reactor installation tool to a reactor sleeve using said reactor sleeve attachment means;
    lowering said reactor sleeve into a reactor tube;
    engaging said expandable clamping unit to directly contact an inner surface face of said reactor tube to releasably secure said reactor installation tool to said reactor tube;
    raising said reactor sleeve attachment means to raise said reactor sleeve in said reactor tube;
    releasing said expandable clamping unit from said reactor tube, and
    removing said reactor installation tool from said reactor tube.

2. The method of claim 1, said expandable clamping unit being an expandable jaw unit.

3. The method of claim 2, said expandable jaw unit comprising at least two clamp shoes.

4. The method of claim 3, said expandable jaw unit further comprising a mounting sleeve.

5. The method of claim 4, said clamp shoes being attached to said mounting sleeve.

6. The method of claim 5, said clamp shoes being movably attached to said mounting sleeve such that said clamp shoes can extend outward from said mounting sleeve and retract towards said clamp body.

7. The method of claim 5, said clamp shoes being movably attached to said mounting sleeve by a pneumatic cylinder.

8. The method of claim 3, said clamp shoes having at least two faces, one of said at least two faces having a radius for contacting said inner surface face of said reactor tube.

9. The method of claim 1, said reactor sleeve being loaded with a reactor unit.

10. The method of claim 9, said reactor unit being removed from said reactor sleeve by said raising of said reactor sleeve attachment means to lift up said reactor sleeve in said reactor tube.

11. The method of claim 10, said reactor unit being positioned in said reactor tube.

12. The method of claim 11, said reactor unit being positioned in said reactor tube below said expandable clamping unit releasably securing said reactor installation tool to said reactor tube.

13. The method of claim 1, said expandable clamping unit being connected to a pressurized air supply for expanding said expandable clamping unit to contact said reactor tube for releasably securing said reactor installation tool to said reactor tube.

14. The method of claim 13, said engaging of said expandable clamping unit to releasably secure said reactor installation tool to said reactor tube being achieved by energizing said pressurized air supply.

15. The method of claim 13, said releasing of said expandable clamping unit from said reactor tube being achieved by reverse energizing said pressurized air supply.

16. The method of claim 1, said expandable clamping unit having clamp shoes for pressing against said inner surface face of said reactor tube for releasably securing said reactor installation tool to said reactor tube.

17. The method of claim 16, said clamp shoes having a face for contacting said reactor tube, said face having a radius.

18. The method of claim 16, said reactor tube being hollow.

19. The method of claim 1, said reactor sleeve being releasably attached to said reactor installation tool.

20. The method of claim 1, said reactor tube having a diameter and an inner surface face.

* * * * *